US012811855B2

(12) United States Patent
Shan

(10) Patent No.: US 12,811,855 B2
(45) Date of Patent: Nov. 24, 2026

(54) PACKET SWITCHED DATA OFF AND POLICY PROVISIONING

(71) Applicant: Intel Products IP LLC, Santa Clara, CA (US)

(72) Inventor: Chang Hong Shan, Shanghai (CN)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 19/126,063

(22) PCT Filed: Dec. 6, 2023

(86) PCT No.: PCT/US2023/082726
§ 371 (c)(1),
(2) Date: Apr. 30, 2025

(87) PCT Pub. No.: WO2024/147880
PCT Pub. Date: Jul. 11, 2024

(65) Prior Publication Data

US 2026/0180864 A1 Jun. 25, 2026

(30) Foreign Application Priority Data

Jan. 6, 2023 (WO) ................ PCT/CN2023/070868
Jan. 6, 2023 (WO) ................ PCT/CN2023/070892

(51) Int. Cl.
*H04L 41/0894* (2022.01)
*H04L 12/14* (2024.01)
(Continued)

(52) U.S. Cl.
CPC ...... *H04L 41/0894* (2022.05); *H04L 12/1407* (2013.01); *H04L 47/2475* (2013.01);
(Continued)

(58) Field of Classification Search
CPC ............. H04L 41/0894; H04L 12/1407; H04L 47/2475; H04W 76/22; H04W 4/24; H04W 88/10
See application file for complete search history.

(56) References Cited

U.S. PATENT DOCUMENTS

2022/0329530 A1* 10/2022 Yang ....................... H04L 45/26
2023/0136984 A1* 5/2023 Lee ....................... H04W 40/24 370/392
2024/0236902 A1* 7/2024 Kim ...................... H04W 48/16

OTHER PUBLICATIONS

3GPP, TSG SA; Study on enhancement of 5G UE Policy (Release 18), 3GPP TR 23.700-85 V1.2.0, Nov. 29, 2022 (Year: 2022).*
(Continued)

*Primary Examiner* — Suraj M Joshi
(74) *Attorney, Agent, or Firm* — Schwegman Lundberg & Woessner, P.A.

(57) ABSTRACT

An apparatus and system are described for supporting user equipment (UE) Policy Provisioning and Packet Switched Data Off (PSDO) in a 6G system. A Central Unit for Control Plane (CU-CP) receives a Registration Request message from UE that contains a UE Policy Container, the UE Policy Container including Policy Set Identifiers (PSIs), a UE Policy Support/Request indication, and an operating system (OS) identifier (ID). A UE Policy Association is established with a UE Policy Control Function (UE-PCF) and the UE Policy Container to the UE-PCF. A PSDO status is received from the UE at a Distributed Unit for Control Plane (DU-CP) and an updated Policy and Charging Control (PCC) rule applied to a user plane function (UPF) for enforcement based on the PSDO status.

20 Claims, 12 Drawing Sheets

(51) Int. Cl.
*H04L 47/2475* (2022.01)
*H04W 4/24* (2018.01)
*H04W 76/22* (2018.01)
*H04W 88/10* (2009.01)

(52) U.S. Cl.
CPC ............ *H04W 4/24* (2013.01); *H04W 76/22* (2018.02); *H04W 88/10* (2013.01)

(56) References Cited

OTHER PUBLICATIONS

"3GPP; TSG CT; 5G System; Session Management Policy Control Service; Stage 3 (Release 18)", 3GPP TS 29.512 V18.0.0, (Dec. 16, 2022), 70 pgs.
"3GPP; TSG SA; Study on enhancement of 5G UE policy (Release 18)", 3GPP TR 23.700-85 VI.2.0, (Nov. 29, 2022).
"International Application Serial No. PCT/US2023/082726, International Search Report mailed Apr. 9, 2024", 5 pgs.
"International Application Serial No. PCT/US2023/082726, Written Opinion mailed Apr. 9, 2024", 6 pgs.
Ericsson, "Correction to PS Data off", C3-202273, 3GPP TSG CT WG3 Meeting #109-e, (Apr. 14, 2020), 3 pgs.
Ericsson, LM, "Clarification of Traffic Identification description and addition of identified open issues", S4-210822, 3GPP TSG SA WG4 Meeting #114-e, (May 12, 2021), 10 pgs.
Intel, et al., "New SID: Study on enhancement of 5G UE Policy", S2-2107291, 3GPP TSG SA WG2 Meeting #147-e, (Oct. 11, 2021), 5 pgs.

* cited by examiner

PACKET SWITCHED DATA OFF AND POLICY PROVISIONING

PRIORITY CLAIM

This application is a U.S. National Stage Filing under 35 U.S.C. 371 from International Application No. PCT/US2023/082726, filed Dec. 6, 2023 and published in English as WO 2024/147880 on Jul. 11, 2024, which claims the benefit of priority to International Application No. PCT/CN2023/070892, filed Jan. 6, 2023, and International Application No. PCT/CN2023/070868, filed Jan. 6, 2023, each of which is incorporated herein by reference in its entirety.

BACKGROUND

Mobile communication has evolved significantly from early voice systems to highly sophisticated integrated communication platform. Next-generation (NG) wireless communication systems, including $5^{th}$ generation (5G) and sixth generation (6G) or new radio (NR) systems, are to provide access to information and sharing of data by various users (e.g., user equipment (UEs)) and applications. NR is to be a unified network/system that is to meet vastly different and sometimes conflicting performance dimensions and services driven by different services and applications. As such the complexity of such communication systems has increased. As expected, a number of issues abound with the advent of any new technology, including complexities related to UE policy provisioning as well as packet switched (PS) Data Off applications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
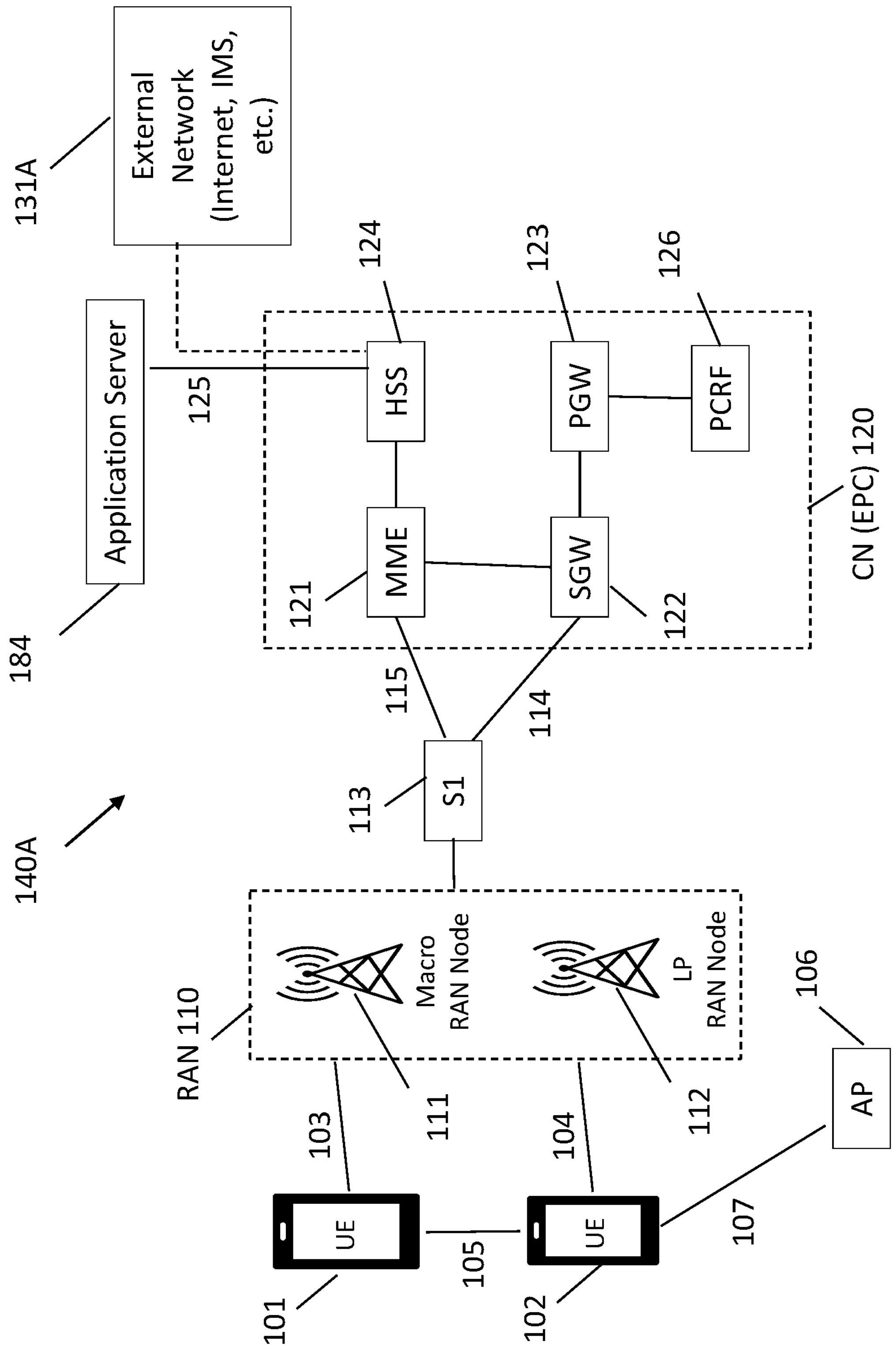
FIG. 1A illustrates an architecture of a network, in accordance with some aspects.

FIG. 1A illustrates an architecture of a network in accordance with some aspects. The network 140A includes 3GPP Long Term Evolution (LTE), $4^{th}$ generation (4G) and $5^{th}$ generation (5G) (or next generation (NG)) network functions that may be extended to 6G functions. Accordingly, although 5G will be referred to, it is to be understood that this is to extend as able to 6G structures, systems, and functions. A network function may be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 may be collectively referred to herein as UE 101, and UE 101 may be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IOT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.)

to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and may be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a UMTS protocol, a 3GPP LTE protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) may be referred to as base stations (BSs), NodeBs, evolved NodeBs (eNBs), 5$^{th}$ Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 may be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and may be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 may be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities'handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A may be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/5GC) can include an access and mobility function (AMF) and/or a user plane function (UPF). The AMF and the UPF may be communicatively coupled to the gNBs and the NG-eNBs via NG interfaces. More specifically, in some aspects, the gNBs and the NG-eNBs may be connected to the AMF by NG-C interfaces, and to the UPF by NG-U interfaces. The gNBs and the NG-eNBs may be coupled to each other via Xn interfaces.

In some aspects, the NG system architecture can use reference points between various nodes. In some aspects, each of the gNBs and the NG-eNBs may be implemented as a base station, a mobile edge server, a small cell, a home eNB, and so forth. In some aspects, a gNB may be a primary node (MN) and NG-eNB may be a secondary node (SN) in a 5G architecture.

Figure 1B:
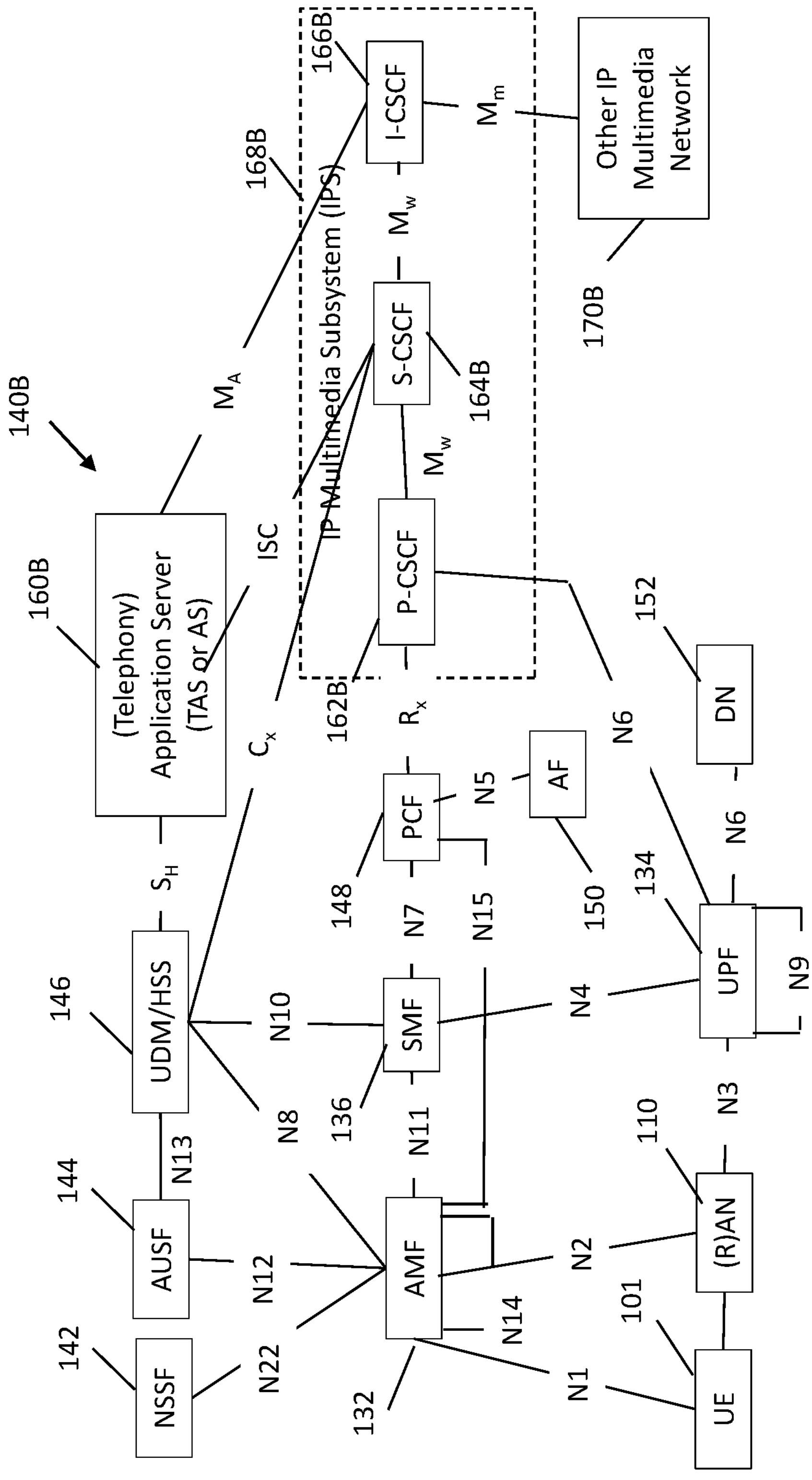
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 may be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 may be used to manage access control and mobility and can also include network slice selection functionality. The AMF 132 may provide UE-based authentication, authorization, mobility management, etc., and may be independent of the access technologies. The SMF 136 may be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 may be deployed in one or more configurations according to the desired service type and may be connected with a data network. The PCF 148 may be configured to provide a policy framework using network slicing, mobility management, and roaming (similar to PCRF in a 4G communication system). The UDM may be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162B, a serving CSCF (S-CSCF) 164B, an emergency CSCF (E-CSCF) (not illustrated in FIG. 1B), or interrogating CSCF (I-CSCF) 166B. The P-CSCF 162B may be configured to be the first contact point for the UE 102 within the IM subsystem (IMS) 168B. The S-CSCF 164B may be configured to handle the session states in the network, and the E-CSCF may be configured to handle certain aspects of emergency sessions such as routing an emergency request to the correct emergency center or PSAP. The I-CSCF 166B may be configured to function as the contact point within an operator's network for all IMS connections destined to a subscriber of that network operator, or a roaming subscriber currently located within that network operator's service area. In some aspects, the I-CSCF 166B may be connected to another IP multimedia network 170B, e.g., an IMS operated by a different network operator.

In some aspects, the UDM/HSS 146 may be coupled to an application server 184, which can include a telephony application server (TAS) or another application server (AS) 160B. The AS 160B may be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
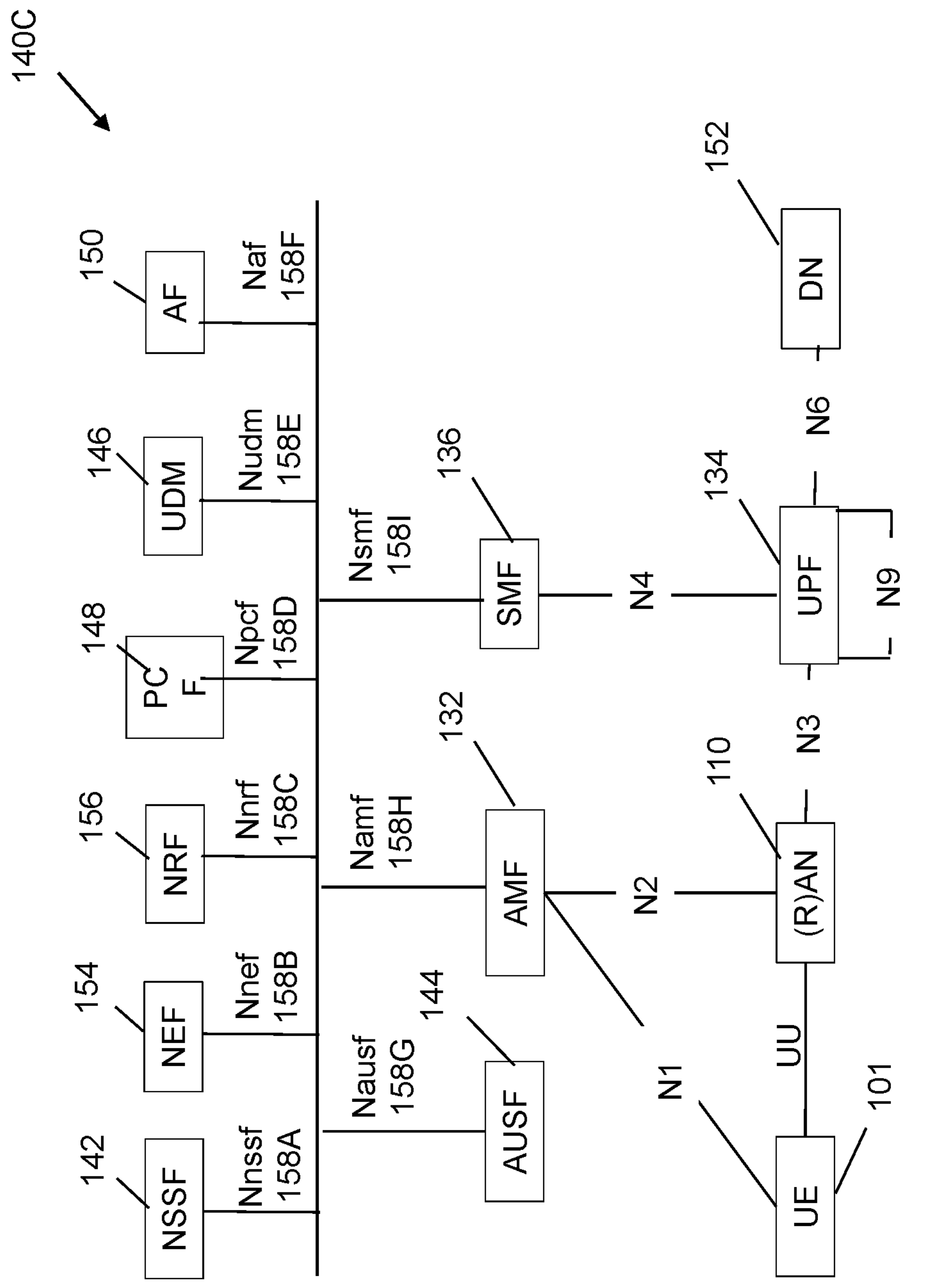
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures may be service-based and interaction between network functions may be represented by corresponding point-to-point reference points Ni or as service-based interfaces.

In some aspects, as illustrated in FIG. 1C, service-based representations may be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein may be used for supporting high reliability in distributed communication systems with dynamic topologies, including sidelink NR V2X communication systems.

Figure 2:
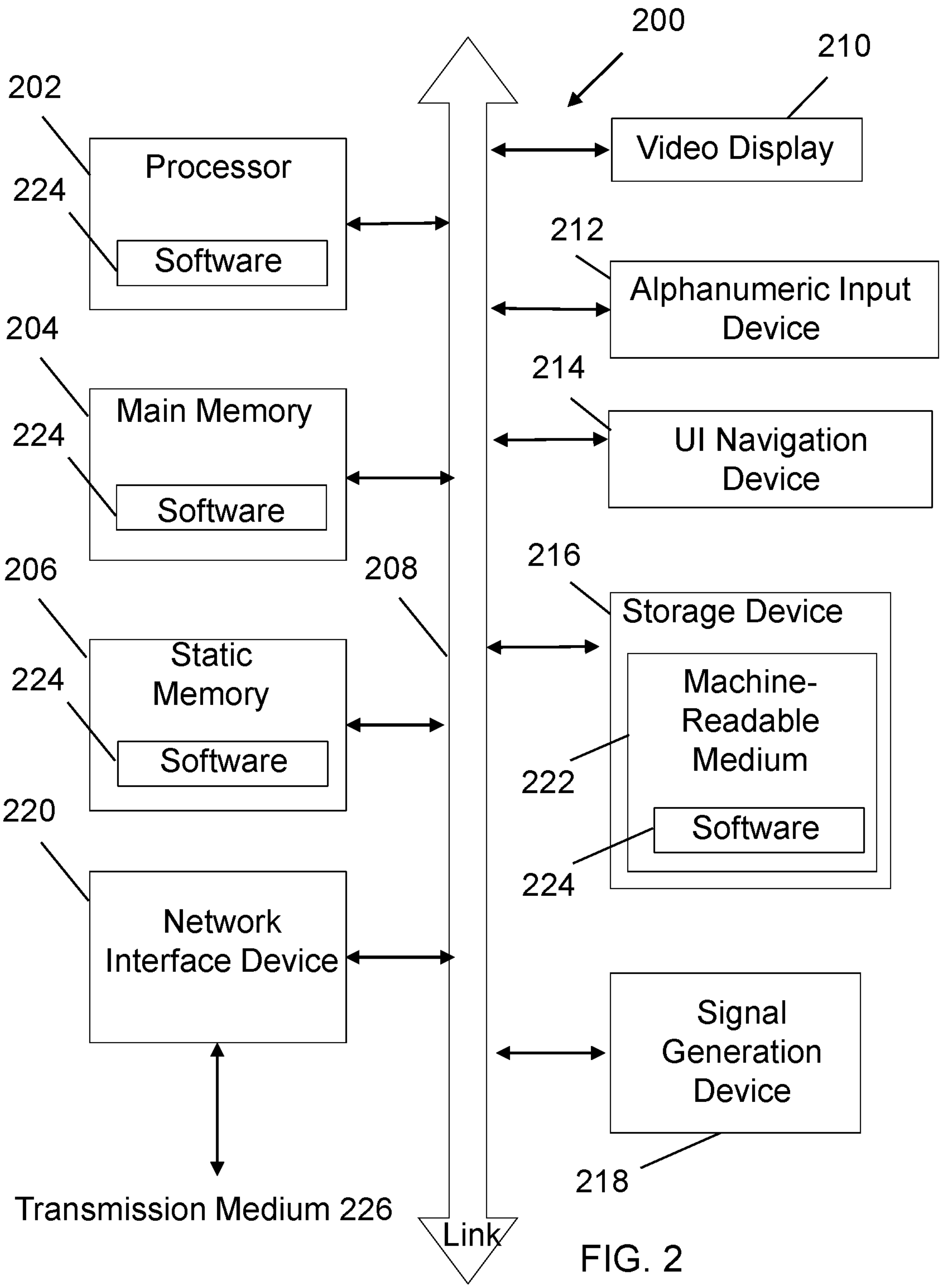
FIG. 2 illustrates a block diagram of a communication device in accordance with some aspects.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or another sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The non-transitory machine readable medium 222 is a tangible medium. A storage device 216 that includes the non-transitory machine readable medium should not be construed as that either the device or the machine-readable medium is itself incapable of having physical movement. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as IEEE 802.11 family of standards known as Wi-Fi, IEEE 802.16 family of standards known as WiMax, IEEE 802.15.4 family of standards, an LTE family of standards, a UMTS family of standards, peer-to-peer (P2P) networks, a 5G standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a GSM radio communication technology, a GPRS radio communication technology, an Enhanced Data Rates for GSM Evolution (EDGE) radio communication technology, and/or a Third Generation Partnership Project (3GPP) radio communication technology, for example UMTS, Freedom of Multimedia Access (FOMA), 3GPP LTE, 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), UMTS (3G), Wideband Code Division Multiple Access (UMTS) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), UMTS-Time-Division Duplex (UMTS-TDD), TD-CDMA, Time Division-Synchronous Code Division Multiple Access, 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), E-UTRA, LTE Advanced (4G), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), PTT, Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, Dedicated Short Range Communications (DSRC) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein may be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include International Mobile Telecommunications spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710 2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band, but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme may be used on a secondary basis on bands such as the TV White Space bands (typically below 790 MHz) where in particular the 400 MHz and 700 MHz bands are promising candidates. Besides cellular applications, specific applications for vertical markets may be addressed such as Program Making and Special Events (PMSE), medical, health, surgery, automotive, low-latency, drones, etc. applications.

As above, various features introduced in the 5G network are to be incorporated in the next generation 6G network. Various UE Policies that were introduced in 5GS include the UE Route Selection Policy (URSP), Access Network Discovery and Selection Policy (ANDSP), Vehicle-to-anything Policy (V2XP) and Proximity Services Policy (ProSeP). Such policies support 5G key features including, for example. Network Slicing, Access Traffic Steering, Switching and Splitting (ATSSS), Edge Computing, V2X and ProSe. Considering interworking with 5GS and continuous support for such key features, the intent in 6G is to continue to support the UE Policies, which are to be adapted to the 6G architecture.

Figure 3:
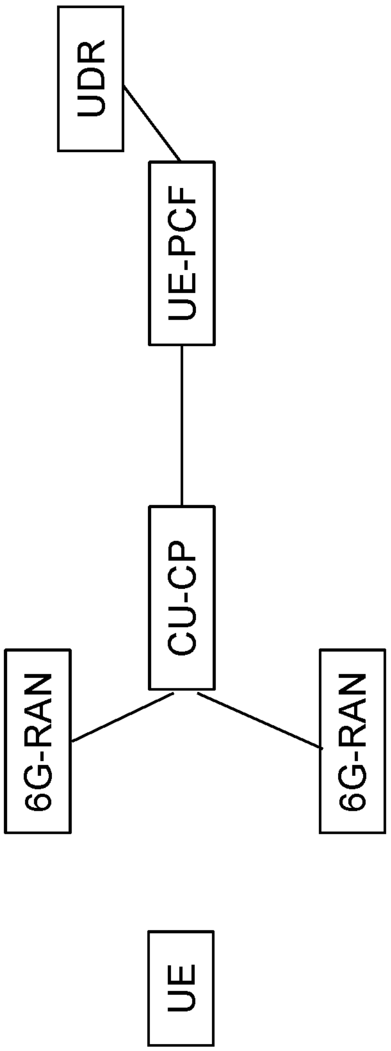
FIG. 3 illustrates a non-roaming architecture to support UE Policy provisioning in accordance with some embodiments.

FIG. 3 illustrates a non-roaming architecture to support UE Policy provisioning in accordance with some embodiments. The various components shown in FIG. 3 include the UE, one or more 6G-RANs, a Central Unit for Control Plane (CU-CP), a UE Policy Control Function (UE-PCF), and a Unified Data Repository (UDR).

In relation to UE Policy provisioning, the UE is configured to report a UE Policy Container to the UE-PCF, as well as request the UE Policy from the UE-PCF. The UE is also configured to retrieve and store the UE Policy from the UE-PCF. The UE is coupled to the UE-PCF through the one or more 6G-RANs.

The 6G-RANs shown in FIG. 3 are connected to the CU-CP. The CU-CP provides functionality equivalent to the AMF in the 5GS, as well as additional 6G functionality. In particular, in relation to UE Policy provisioning, the CU-CP is configured to forward the UE Policy Container received from the UE to the UE-PCF and forward the UE Policy information received from the UE-PCF to the UE. In addition, the CU-CP is configured to report events to the UE-PCF to which the UE-PCF has subscribed.

The UE-PCF is responsible for UE policy delivery to the UE. In addition, the UE-PCF is configured to store the UE policy in and retrieve the UE policy from the UDR.

The subscription data is stored by the UDR and retrieved from the UDR by the UDM. Similarly, the policy data is stored by the UDR and retrieved by the PCF.

Figure 4:
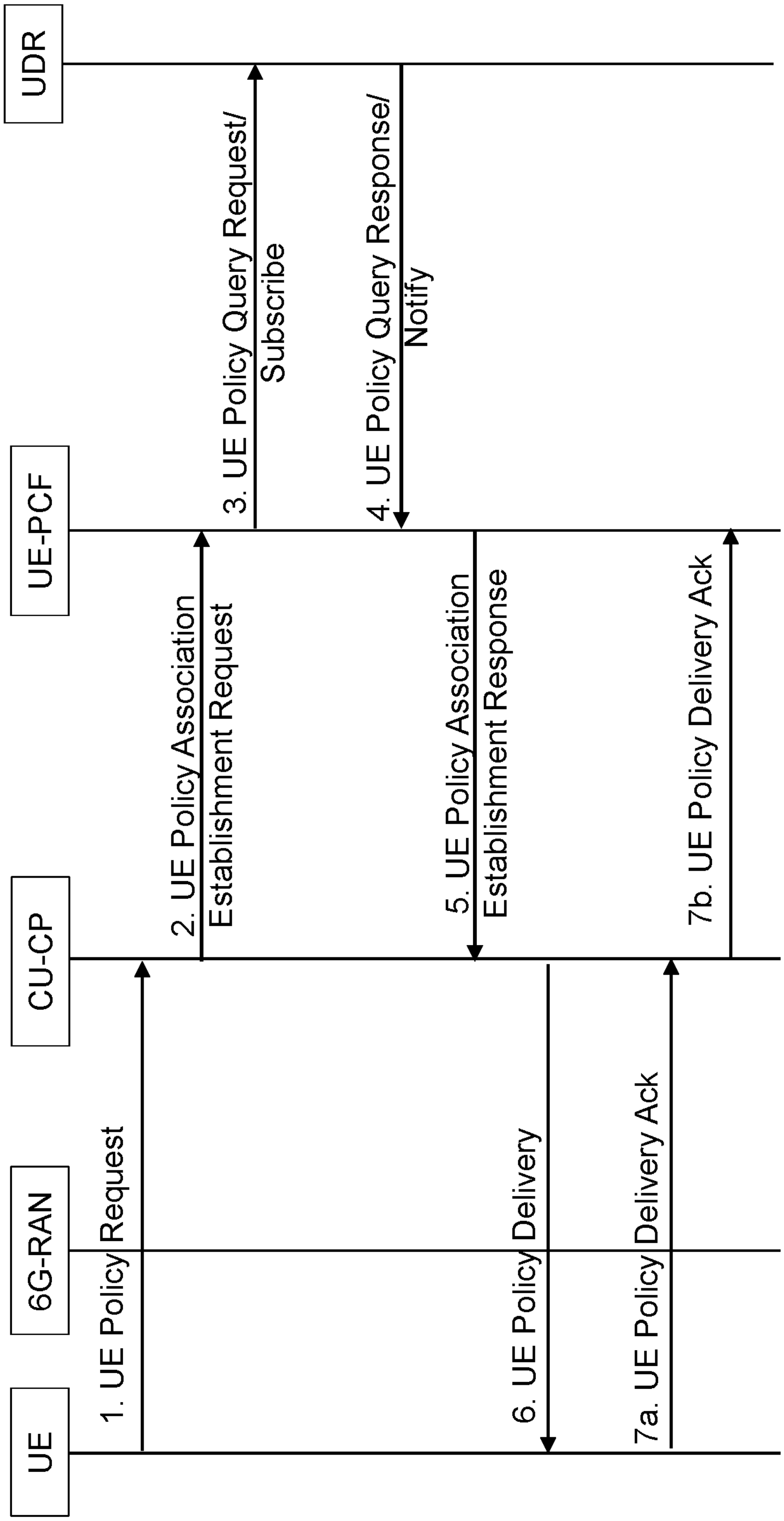
FIG. 4 illustrates a UE Policy provisioning procedure in accordance with some embodiments.

FIG. 4 illustrates a UE Policy provisioning procedure in accordance with some embodiments.

At operation 1, the UE includes the UE Policy Container including one or more of Policy Set Identifiers (PSIs), a UE Policy Support/Request indication, and/or an operating system (OS) ID (e.g., IPhone, Android) in the UE Policy Request message. The UE Policy Container may be carried in a Registration Request message, for example, sent to the CU-CP (e.g., the AMF). The UE Policy Container is transparent to the CU-CP. The UE Policy Support/Request indication may be for one or more of URSP, ANDSP, V2XP, ProSeP, among others.

At operation 2, when the CU-CP receives the UE Policy Container, the CU-CP establishes a UE Policy Association with the UE-PCF using a UE Policy Association Establishment request. The UE-PCF forwards the received UE Policy Container to the UE-PCF.

At operation 3, the UE-PCF queries the UE Policy information (e.g., URSP, ANDSP, V2XP, ProSeP, etc.) in the received UE Policy Container from the UDR based on the UE Policy Association Establishment request. The UE-PCF sends the UE Policy Support/Request indication to the UDR in a UE Query Policy Request/Subscription. The UE-PCF may obtain policy subscription-related information and the latest list of PSIs from the UDR. The UE-PCF also may request notifications from the UDR on changes on the UE Policy.

At operation 4, the UDR sends the UE policy information to the UE-PCF based on the UE Policy Support/Request indication received from the UE-PCF in a UE Query Policy Response/Notification. The UE-PCF may divide the UE Policy information into different Policy Sections identified by Policy Section IDs and ensure that different UE Policy types are not contained in a single Policy Section.

At operation 5, the UE-PCF sends the UE Policy information in the UE Policy Container to the CU-CP (e.g., AMF) using a UE Policy Association Establishment Response. The UE Policy Container contains the PSI and the UE Policy information.

At operation 6, the CU-CP (e.g., AMF) forwards the UE Policy Container received from the UE-PCF to the UE using a UE Policy Delivery message.

At operation 7, an acknowledgement of reception by the UE of the UE Policy is sent to the CU-CP (e.g., AMF). The CU-CP (e.g., AMF) may then forward the acknowledgment to the UE-PCF.

In addition to UE policy provisioning, PS Data Off (PSDO) may be adapted for 6G. PSDO is a feature that, when activated by the user, may prevent transport via 3GPP access of all IP packets except those related to 3GPP PSDO Exempt Services. The 3GPP PSDO Exempt Services are a set of operator services that are the only allowed services when the 3GPP PSDO feature has been activated by the user. PSDO may be configured by a home public land mobile network (HPLMN) and activated by the user.

When 3GPP PSDO is activated in the UE, the UE may inform the network that 3GPP PSDO is activated. At this point, the UE may no longer transmit UL IP Packets of services that are not 3GPP PSDO Exempt Services, and the network may no longer transmit DL IP Packets to the UE for services that are not 3GPP PSDO Exempt Services. The services that are configurable by the HPLMN operator on a per PLMN basis to be part of the 3GPP PSDO Exempt Services may include MMTel Voice/Video; SMS over IMS; USSD over IMS (USSI); particular IMS services not defined by 3GPP, where each such IMS service is identified by an IMS communication service identifier; Device Management over PS; and IMS Supplementary Service configuration via the Ut interface using XCAP.

The UE may discover whether a P-GW supports the 3GPP PSDO feature during Initial Attach to the network and during the establishment of a PDN connection via the presence of the 3GPP PSDO Support Indication in the Create Session response message from the S-GW to the MME. The UE may report the 3GPP PSDO status in the PCO to the P-GW during Initial Attach procedure.

Figure 5:
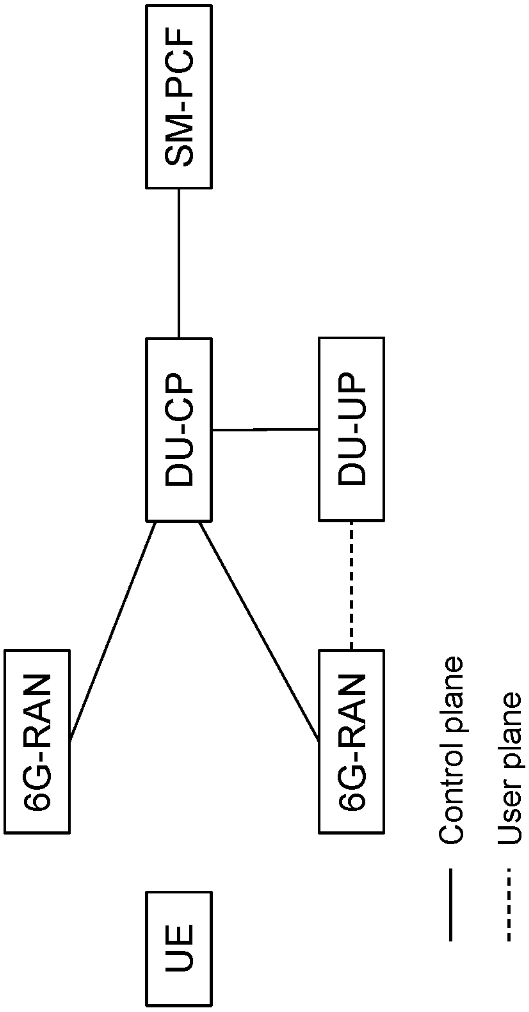
FIG. 5 illustrates a non-roaming architecture to support 3GPP PS Data Off in accordance with some embodiments.

FIG. 5 illustrates a non-roaming architecture to support 3GPP PSDO in accordance with some embodiments. The various components shown in FIG. 5 include the UE, one or more 6G-RANs, a Distributed Unit for Control Plane (DU-CP), a: Distributed Unit for User Plane (DU-UP), and a SMF Policy Control Function (SMF-PCF). The DU-CP is similar to the SMF in 5GS, the DU-UP is similar to the UPF in 5GS.

In relation to PSDO, the UE is configured to activate and deactivate the PSDO status and report the status to the DU-CP.

The 6G-RANs shown in FIG. 5 are connected to the DU-CP. The DU-CP receives the PSDO status from the UE and is responsible for session management and control of the UP function in the DU-UP. The DU-CP also reports the PSDO status to a Session Management Policy Control Function (SM-PCF). The DU-CP further receives Policy and Charging Control (PCC) rules with corresponding gate status from the SM-PCF and sends the PCC rules to the DU-UP for enforcement.

The SM-PCF receives the PSDO status from the DU-CP. The SM-PCF also adjusts the gate status of a PCC rule based on the received PSDO status and sends the updated PCC rule to the DU-CP.

The DU-UP is the user plane function that enforces the PCC rule received from the DU-CP to prevent specific traffic from traversing the DU-UP.

Figure 6:
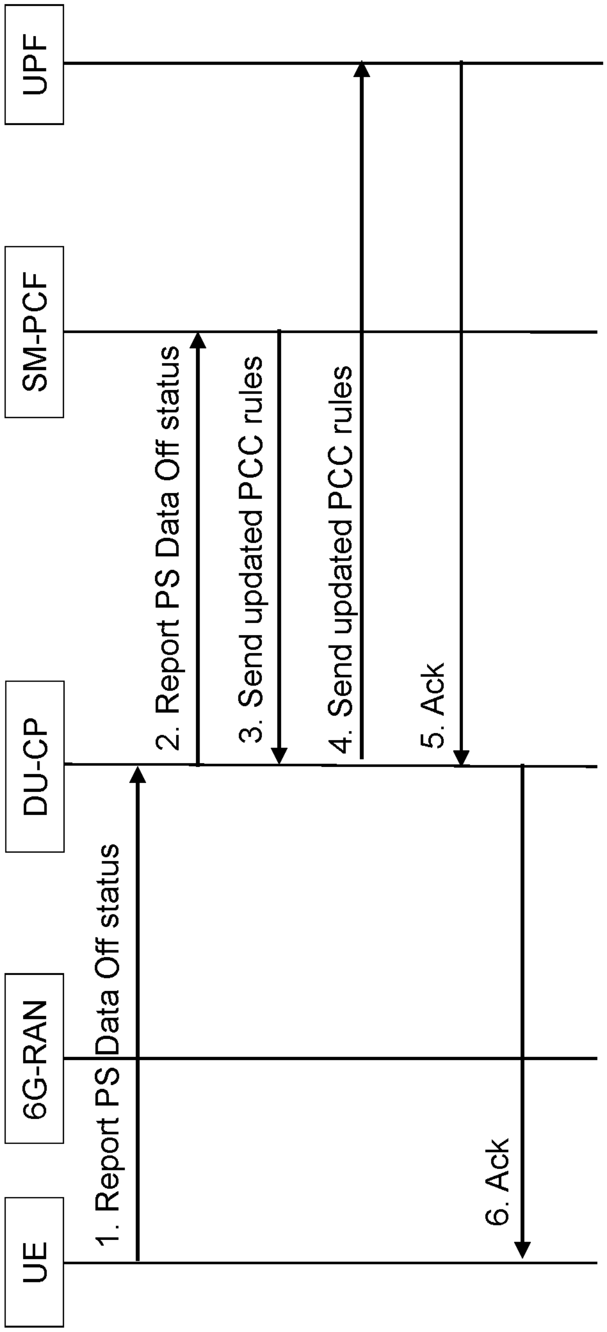
FIG. 6 illustrates a PS Data Off reporting procedure in accordance with some embodiments.

FIG. 6 illustrates a PSDO reporting procedure in accordance with some embodiments. In FIG. 6, at operation 1 the UE reports the PSDO status (i.e., active, inactive) to the DU-CP (e.g., SMF in 5GS). This report occurs during protocol data unit (PDU) Session establishment or change of the PSDO status in the UE. Once the PSDO status is set to "active", the UE prevents sending uplink traffic for applications not belonging to the 3GPP PSDO Exempt Services. The PSDO status can be carried in the extended Protocol Configuration Option (ePCO). The ePCO is used to transfer external network protocol options associated with a packet data protocol (PDP) context activation. The ePCO is a component of a non-access stratum (NAS) message and may be carried by messages such as a PDU session establishment request and/or accept.

At operation 2, in response to reception of the PSDO status by the DU-CP, the DU-CP further reports the PSDO status to the SM-PCF (if the SM-PCF has been deployed). Otherwise, the DU-CP adjusts the gate status in the PCC rule for the impacted traffic.

At operation 3, the SM-PCF adjusts the gate status in the PCC rule for the impacted applications not belonging to 3GPP PSDO Exempt Services. The SM-PCF also sends the updated PCC rules to the DU-CP for the impacted traffic.

At operation 4, the DU-CP sends the updated PCC rules to the UPF for enforcement. If the gate status is set to "closed" for specific traffic filters in uplink or downlink direction, the UPF blocks the uplink or downlink traffic for those traffic filters.

At operation 5, the UPF acknowledges to the DU-CP reception of the PCC rules.

At operation 6, the DU-CP acknowledges to the UE the reception of the PSDO status.

Figure 7:
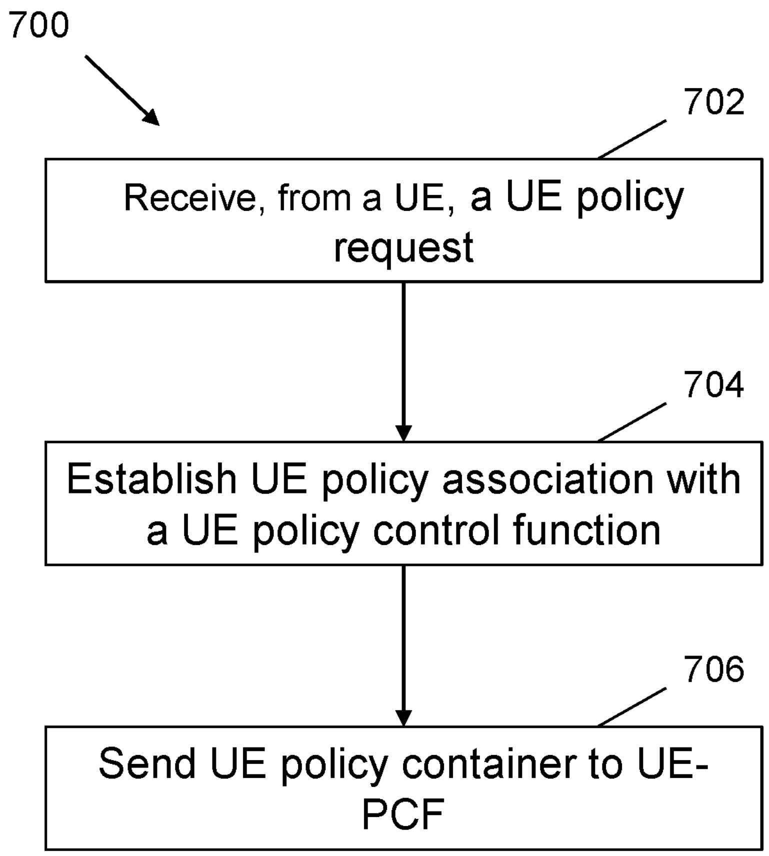
FIG. 7 illustrates a method of UE policy provisioning in accordance with some aspects.

In some embodiments, the electronic device(s), network(s), system(s), chip(s) or component(s), or portions or implementations thereof of the figures herein may be configured to perform one or more processes, techniques, or methods as described herein, or portions thereof. One such process is depicted in FIG. 7, which illustrates a method of UE policy provisioning in accordance with some aspects. The process 700 may be performed by a CU-CP or a portion thereof. For example, the process 700 may include, at operation 702, receiving a UE policy request from a UE. The UE policy request includes a UE policy container. At operation 704, the process 700 may further include establishing a UE policy association with a UE policy control function (UE-PCF). At operation 706, the process 700 may further include sending the UE policy container to the UE-PCF.

Figure 8:
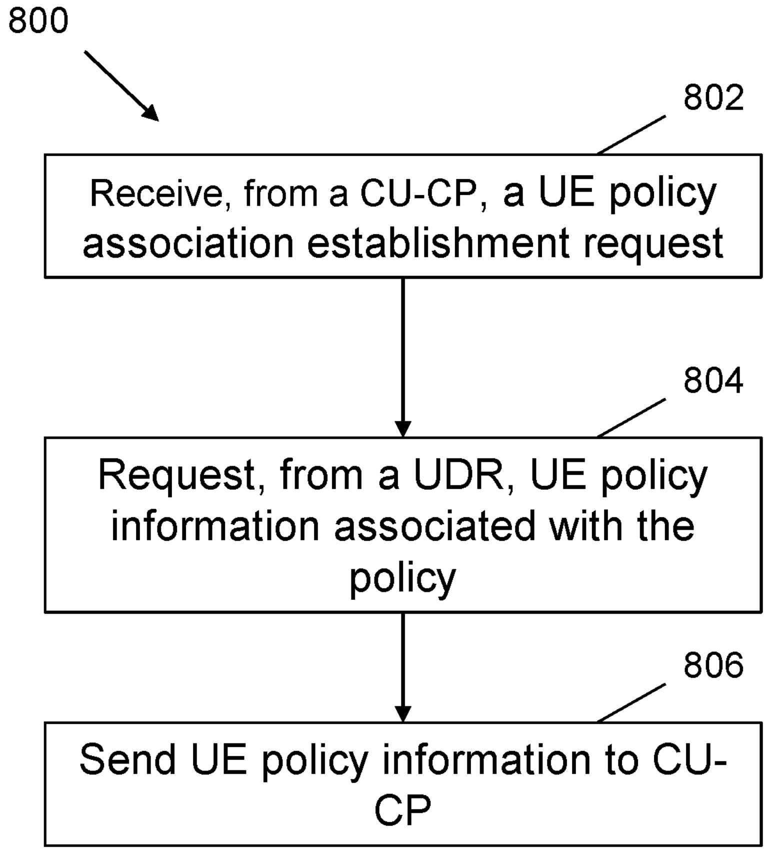
FIG. 8 illustrates a method of UE policy provisioning in accordance with some aspects.

FIG. 8 illustrates a method of UE policy provisioning in accordance with some aspects. The process 800 may be performed by a UE-PCF or a portion thereof. At operation 802, the process 800 may include receiving, from a CU-CP, a UE policy association establishment request that includes a UE policy container associated with a policy. At operation 804, the process 800 may further include requesting UE policy information associated with the policy from a UDR based on the UE policy container. At operation 806, the process 800 may further include sending the UE policy information to the CU-CP for forwarding to a UE.

Figure 9:
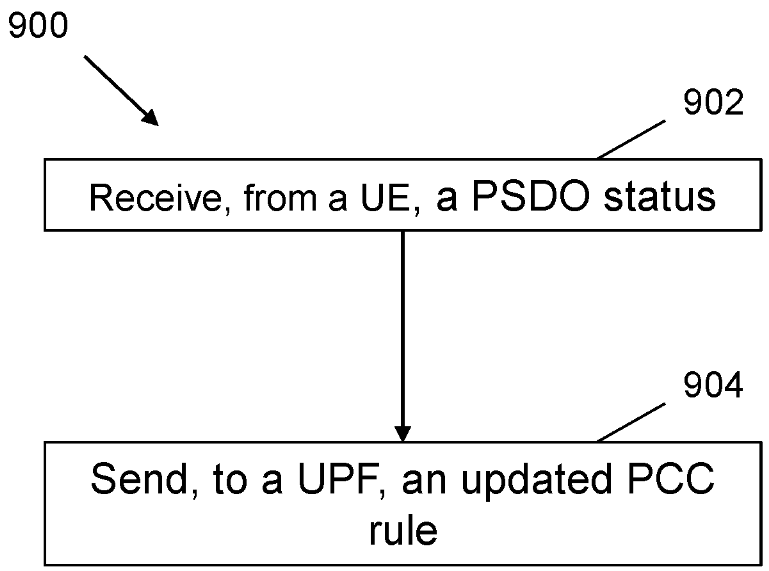
FIG. 9 illustrates a method of PS Data Off reporting in accordance with some aspects.

FIG. 9 illustrates a method of PS Data Off reporting in accordance with some aspects. The process 900 may be performed by a DU-CP or a portion thereof. For example, the process 900 may include, at operation 902, receiving a message from a UE to indicate a PSDO status. At operation 904, the process 900 may further include sending an updated PCC rule to a UPF based on the PSDO status.

Figure 10:
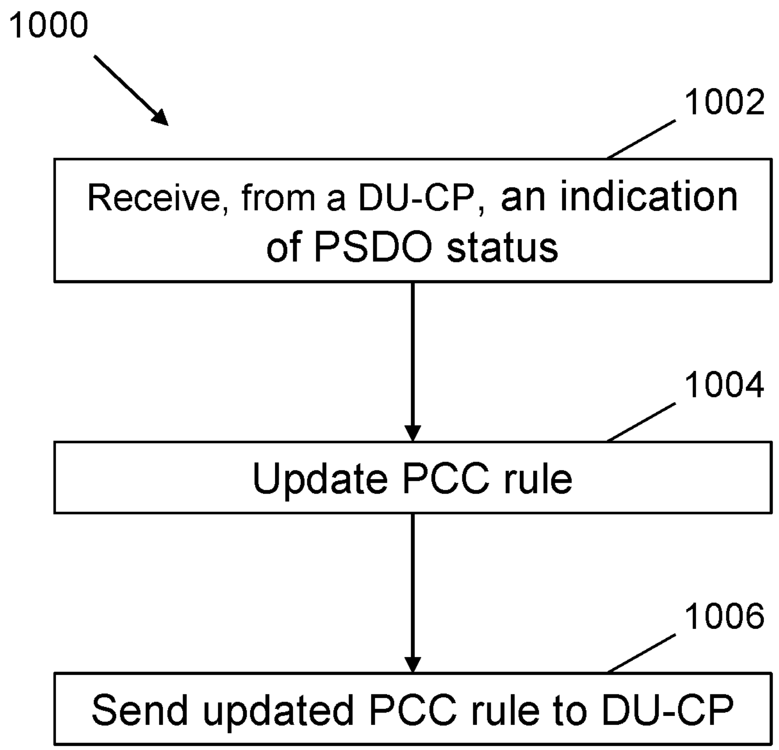
FIG. 10 illustrates a method of PS Data Off reporting in accordance with some aspects.

FIG. 10 illustrates a method of PS Data Off reporting in accordance with some aspects. The process 100 may be performed by a SM-PCF or a portion thereof. At operation 1002, the process 1000 may include receiving, from a DU-CP, an indication of a PSDO status of a UE. At operation 1004, the process 1000 may further include updating a PCC rule based on the PS data off status. At operation 1006, the process 1000 may further include sending the updated PCC rule to the DU-CP.

EXAMPLES

Example 1 is an apparatus configured to operate as a Central Unit for Control Plane (CU-CP) in a 6th generation (6G) system, the apparatus comprising: processing circuitry to configure the CU-CP in the 6G system to: receive, from a user equipment (UE), a UE Policy Container; establish, in response to reception of the UE Policy Container, a UE Policy Association with a UE Policy Control Function (UE-PCF); and forward the UE Policy Container to the UE-PCF; and a memory configured to store the UE Policy Association.

In Example 2, the subject matter of Example 1 includes, wherein the UE Policy Container contains at least one of Policy Set Identifiers (PSIs), a UE Policy Support/Request indication, or an operating system (OS) identifier (ID).

In Example 3, the subject matter of Examples 1-2 includes, wherein the processing circuitry configures the CU-CP to receive a Registration Request message that contains the UE Policy Container.

In Example 4, the subject matter of Examples 1-3 includes, wherein the processing circuitry further configures the CU-CP to send, to the UE-PCF, a UE Policy Association Establishment Request that contains the UE Policy Container.

In Example 5, the subject matter of Examples 1-4 includes, XP), or a Proximity Services Policy (ProSeP).

In Example 6, the subject matter of Examples 1-5 includes, wherein the processing circuitry further configures the CU-CP to receive, from the UE-PCF in response to reception of the UE Policy Container, UE Policy information stored in a Unified Data Repository (UDR).

In Example 7, the subject matter of Example 6 includes, XP), or a Proximity Services Policy (ProSeP).

In Example 8, the subject matter of Examples 6-7 includes, wherein the processing circuitry further configures the CU-CP to: forward the UE Policy information to the UE; receive, from the UE in response to reception of the UE Policy information, an acknowledgement of the reception of the UE Policy information by the UE; and in response to reception of the acknowledgement from the UE, send the acknowledgement to the UE-PCF.

Example 9 is an apparatus configured to operate as a Distributed Unit for Control Plane (DU-CP) in a 6th generation (6G) system, the apparatus comprising: processing circuitry to configure the DU-CP in the 6G system to: receive, from a user equipment (UE), a Packet Switched Data Off (PSDO) status; and in response to PSDO status, apply an updated Policy and Charging Control (PCC) rule to a user plane function (UPF) for enforcement based on the PSDO status received from the UE; and a memory configured to store the PSDO status.

In Example 10, the subject matter of Example 9 includes, wherein the processing circuitry further configures the DU-CP to receive the PSDO status during at least one of establishment of a new protocol data unit (PDU) Session or change of an existing PDU session.

In Example 11, the subject matter of Examples 9-10 includes, wherein the processing circuitry further configures the DU-CP to receive the PSDO status in an extended Protocol Configuration Option (ePCO) of a message.

In Example 12, the subject matter of Examples 9-11 includes, GPP PS Data Off Exempt Services once the PSDO status is set to "active".

In Example 13, the subject matter of Examples 9-12 includes, wherein the processing circuitry further configures the DU-CP to: report the PSDO status to a Session Management Policy Control Function (SM-PCF) to adjust a gate status in PCC rules impacted by the PSDO status; and receive, from the SM-PCF in response to reception of the PSDO status, updated PCC rules.

In Example 14, the subject matter of Example 13 includes, wherein the processing circuitry further configures the DU-CP to send the updated PCC rules to the UPF for enforcement and blockage of at least one of uplink or downlink traffic based on a gate status in the updated PCC rules.

In Example 15, the subject matter of Examples 9-14 includes, wherein the processing circuitry further configures the DU-CP to: determine whether a Session Management Policy Control Function (SM-PCF) is deployed; and in response to a determination that the SM-PCF is not deployed, adjust a gate status in PCC rules impacted by the PSDO status.

Example 16 is a computer-readable storage medium that stores instructions for execution by one or more processors of a Central Unit for Control Plane (CU-CP) in a 6th generation (6G) system, the one or more processors to configure the CU-CP to, when the instructions are executed: receive, from a user equipment (UE), a Registration Request message that contains a UE Policy Container, the UE Policy Container including Policy Set Identifiers (PSIs), a UE Policy Support/Request indication, and an operating system (OS) identifier (ID); establish, in response to reception of the UE Policy Container, a UE Policy Association with a UE Policy Control Function (UE-PCF) in the 6G system; and forward the UE Policy Container to the UE-PCF.

In Example 17, the subject matter of Example 16 includes, wherein the one or more processors further configure the CU-CP to, when the instructions are executed, send, to the UE-PCF, a UE Policy Association Establishment Request that contains the UE Policy Container.

In Example 18, the subject matter of Examples 16-17 includes, XP), or Proximity Services Policy (ProSeP).

In Example 19, the subject matter of Examples 16-18 includes, wherein the one or more processors further configure the CU-CP to, when the instructions are executed, receive, from the UE-PCF in response to reception of the UE Policy Container, UE Policy information stored in a Unified Data Repository (UDR).

In Example 20, the subject matter of Example 19 includes, XP), or Proximity Services Policy (ProSeP).

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to indicate one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. As indicated herein, although the term "a" is used herein, one or more of the associated elements may be used in different embodiments. For example, the term "a processor" configured to carry out specific operations includes both a single processor configured to carry out all of the operations as well as multiple processors individually configured to carry out some or all of the operations (which may overlap) such that the combination of processors carry out all of the operations. Further, the term "includes" may be considered to be interpreted as "includes at least" the elements that follow.

The Abstract of the Disclosure is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus configured to operate as a Central Unit for Control Plane (CU-CP) in a $6^{th}$ generation (6G) system, the apparatus comprising:

- processing circuitry to configure the CU-CP in the 6G system to:
  - receive, from a user equipment (UE), a UE Policy Container;
  - establish, in response to reception of the UE Policy Container, a UE Policy Association with a UE Policy Control Function (UE-PCF); and
  - forward the UE Policy Container to the UE-PCF; and
- a memory configured to store the UE Policy Association.

2. The apparatus of claim 1, wherein the UE Policy Container contains at least one of Policy Set Identifiers (PSIs), a UE Policy Support/Request indication, or an operating system (OS) identifier (ID).

3. The apparatus of claim 1, wherein the processing circuitry configures the CU-CP to receive a Registration Request message that contains the UE Policy Container.

4. The apparatus of claim 1, wherein the processing circuitry further configures the CU-CP to send, to the UE-PCF, a UE Policy Association Establishment Request that contains the UE Policy Container.

5. The apparatus of claim 1, wherein the UE Policy Container includes an indication for at least one of a UE Route Selection Policy (URSP), an Access Network Discovery and Selection Policy (ANDSP), a Vehicle-to-anything Policy (V2XP), or a Proximity Services Policy (ProSeP).

6. The apparatus of claim 1, wherein the processing circuitry further configures the CU-CP to receive, from the UE-PCF in response to reception of the UE Policy Container, UE Policy information stored in a Unified Data Repository (UDR).

7. The apparatus of claim 6, wherein the UE Policy information includes a Policy Set Identifier (PSI) for at least one of a UE Route Selection Policy (URSP), an Access Network Discovery and Selection Policy (ANDSP), a Vehicle-to-anything Policy (V2XP), or a Proximity Services Policy (ProSeP).

8. The apparatus of claim 6, wherein the processing circuitry further configures the CU-CP to:

forward the UE Policy information to the UE;

receive, from the UE in response to reception of the UE Policy information, an acknowledgement of the reception of the UE Policy information by the UE; and in response to reception of the acknowledgement from the UE, send the acknowledgement to the UE-PCF.

9. An apparatus configured to operate as a Distributed Unit for Control Plane (DU-CP) in a $6^{th}$ generation (6G) system, the apparatus comprising:

processing circuitry to configure the DU-CP in the 6G system to:

receive, from a user equipment (UE), a Packet Switched Data Off (PSDO) status; and in response to PSDO status, apply an updated Policy and Charging Control (PCC) rule to a user plane function (UPF) for enforcement based on the PSDO status received from the UE; and a memory configured to store the PSDO status.

10. The apparatus of claim 9, wherein the processing circuitry further configures the DU-CP to receive the PSDO status during at least one of establishment of a new protocol data unit (PDU) Session or change of an existing PDU session.

11. The apparatus of claim 9, wherein the processing circuitry further configures the DU-CP to receive the PSDO status in an extended Protocol Configuration Option (ePCO) of a message.

12. The apparatus of claim 9, wherein uplink traffic from the UE to the DU-CP is limited for applications not belonging to 3GPP PS Data Off Exempt Services once the PSDO status is set to “active”.

13. The apparatus of claim 9, wherein the processing circuitry further configures the DU-CP to:

report the PSDO status to a Session Management Policy Control Function (SM-PCF) to adjust a gate status in PCC rules impacted by the PSDO status; and receive, from the SM-PCF in response to reception of the PSDO status, updated PCC rules.

14. The apparatus of claim 13, wherein the processing circuitry further configures the DU-CP to send the updated PCC rules to the UPF for enforcement and blockage of at least one of uplink or downlink traffic based on a gate status in the updated PCC rules.

15. The apparatus of claim 9, wherein the processing circuitry further configures the DU-CP to:

determine whether a Session Management Policy Control Function (SM-PCF) is deployed; and in response to a determination that the SM-PCF is not deployed, adjust a gate status in PCC rules impacted by the PSDO status.

16. A non-transitory computer-readable storage medium that stores instructions for execution by one or more processors of a Central Unit for Control Plane (CU-CP) in a $6^{th}$ generation (6G) system, the one or more processors to configure the CU-CP to, when the instructions are executed:

receive, from a user equipment (UE), a Registration Request message that contains a UE Policy Container, the UE Policy Container including Policy Set Identifiers (PSIs), a UE Policy Support/Request indication, and an operating system (OS) identifier (ID);

establish, in response to reception of the UE Policy Container, a UE Policy Association with a UE Policy Control Function (UE-PCF) in the 6G system; and forward the UE Policy Container to the UE-PCF.

17. The medium of claim 16, wherein the one or more processors further configure the CU-CP to, when the instructions are executed, send, to the UE-PCF, a UE Policy Association Establishment Request that contains the UE Policy Container.

18. The medium of claim 16, wherein the UE Policy Container includes an indication for at least one of a UE Route Selection Policy (URSP), Access Network Discovery and Selection Policy (ANDSP), Vehicle-to-anything Policy (V2XP), or Proximity Services Policy (ProSeP).

19. The medium of claim 16, wherein the one or more processors further configure the CU-CP to, when the instructions are executed, receive, from the UE-PCF in response to reception of the UE Policy Container, UE Policy information stored in a Unified Data Repository (UDR).

20. The medium of claim 19, wherein the UE Policy information includes a PSI for at least one of a UE Route Selection Policy (URSP), Access Network Discovery and Selection Policy (ANDSP), Vehicle-to-anything Policy (V2XP), or Proximity Services Policy (ProSeP).

* * * * *